United States Patent [19]

Mizutani et al.

[11] Patent Number: 5,600,109

[45] Date of Patent: Feb. 4, 1997

[54] ACCELERATION RESPONSIVE SWITCH AND METHOD OF MAKING THE SAME

[75] Inventors: Yasukazu Mizutani; Shigekazu Shibata, both of Nagoya; Mitsuhiro Urano, Toyota; Masayuki Watanabe, Nagoya; Hideki Koseki, Aichi-ken, all of Japan

[73] Assignee: Ubukata Industries Co., Ltd., Nagoya, Japan

[21] Appl. No.: 310,390

[22] Filed: Sep. 22, 1994

[30] Foreign Application Priority Data

| Oct. 1, 1993 | [JP] | Japan | 5-269981 |
| Oct. 6, 1993 | [JP] | Japan | 5-276230 |
| Dec. 15, 1993 | [JP] | Japan | 5-342860 |

[51] Int. Cl.$^6$ .................................................. H01H 35/14
[52] U.S. Cl. ............................................... 200/61.45 R
[58] Field of Search ................... 200/61.45 R–61.45 M

[56] References Cited

U.S. PATENT DOCUMENTS

| 3,619,524 | 11/1971 | Gillund | 200/61.45 |
| 4,001,185 | 1/1977 | Mitsui et al. | 200/61.45 R |
| 4,377,210 | 3/1983 | Monte | 169/62 |
| 4,628,160 | 12/1986 | Canevarl | 200/61.45 R |
| 5,237,135 | 8/1993 | Wolski | 200/61.45 R |
| 5,396,223 | 3/1995 | Iwabuchi et al. | 340/690 |

FOREIGN PATENT DOCUMENTS

| 41-17699 | 8/1966 | Japan | H01H 35/02 |
| 50-127654 | 10/1975 | Japan | H01H 35/02 |
| 50-123870 | 10/1975 | Japan | H01H 35/02 |
| 63-29286 | 2/1988 | Japan | G01V 1/16 |
| 64-79624 | 3/1989 | Japan | G01H 1/00 |
| 2-186224 | 7/1990 | Japan | G01H 1/00 |
| 4-249019 | 9/1992 | Japan | H01H 35/02 |

*Primary Examiner*—Michael L. Gellner
*Assistant Examiner*—Michael A. FriedHofer
*Attorney, Agent, or Firm*—Foley & Lardner

[57] ABSTRACT

An acceleration responsive switch includes a receptacle including a housing having a conical face on an inner bottom face and a header fixed to the housing to close an open end of the housing, a lead terminal fixed in a through-aperture of the header, a contact member secured to an end of the lead terminal located in the housing and including a plurality of feather portions arranged radially to be approximately concentric with the housing, an electrically conductive inertia ball enclosed in the closed receptacle so as to be capable of rolling on the inner bottom face of the housing, a plurality of protrusions formed an inner peripheral wall of the housing, an oscillation damping liquid contained in the receptacle and having a viscosity suitable to apply resistance to the inertia ball so that the inertia ball terminates its rotation when the inertia ball is subjected to an external oscillation to be rotated. When subjected to acceleration, the inertia ball rolls to come into contact with one or more of the feather portions of the contact member so that it electrically conducts between the feather portions and the housing. The inertia ball in a rotational motion collides against the protrusion, changing the course of its movement.

8 Claims, 7 Drawing Sheets

ACCELERATION RESPONSIVE SWITCH AND METHOD OF MAKING THE SAME

BACKGROUND OF THE INVENTION

1. Field of the Invention

This invention relates to an acceleration responsive switch mounted on a gas flowmeter having an automatic shutoff valve and an integrated microcomputer and employed in city gas equipment and commercial propane gas equipment or mounted on control devices of oil space heaters, gas burning appliance and electrical equipment, for detecting oscillation such as an earthquake to thereby supply a detection signal to the automatic shutoff valve or the control devices and further relates to a method of making such an acceleration responsive switch.

2. Description of the Prior Art

A seismosensitive element embodying an acceleration responsive switch of the above-described type is disclosed by U.S. patent application Ser. No. 08/121,522 filed on Sep. 16, 1993 and pending. The disclosed seismosensitive element comprises a metal housing, an electrode member fixed in the housing in an insulated relation thereto, and an electrically conductive inertia ball enclosed in the housing so as to roll when subjected to oscillation, so that the inertia ball comes into contact to the electrode member to thereby conduct between the housing and the electrode member, whereby the element generates a detection signal.

The seismosensitive element as described above has recently been mounted on gas flowmeters having an automatic shutoff valve, an integrated microcomputer and an integrated battery in household city gas equipment and commercial propane gas equipment, so that the gas flowmeters are provided with a function of preventing occurrence of secondary disaster such as fire due to an earthquake or a function of early detection of gas leakage as well as a function of storing data of gas flowrate. Such a gas flowmeter detects oscillation and overturning of equipment due to an earthquake, leakage of gas in large quantities and long-term leakage of gas in small quantities, thereby closing the shutoff valve or activating a warning device for prevention of secondary accidents or disasters.

In detection of an earthquake, an oscillation due to the earthquake needs to be distinguished from an oscillation caused by collision of a flying object with the gas flowmeter or an artificial noise caused by driving of a dump truck or the like or under construction. For this purpose, the seismosensitive element is required to have predetermined signal output characteristics in a frequency band of the oscillation due to the earthquake and different signal output characteristics in the other frequency band.

The quake of an earthquake includes a multiple of oscillations with different frequencies. In most cases, the quake accompanies mainly an oscillation whose frequency is 10 Hz or below and more particularly, an oscillation whose frequency is 5 Hz or below. Accordingly, a sinusoidal oscillation is employed as an alternative characteristic for the earthquake for inspection of a seismosensitive device comprising the above-described seismosensitive element. For example, in the above-described acceleration responsive device having contacts closed and opened by the rolling of the inertia ball, each of "on" and "off" periods of a signal is set at 40 milliseconds or above. In this case, when such a signal as described above is generated three times or more within a predetermined period such as three seconds, the microcomputer is arranged to determine the occurrence of an earthquake, thereby delivering a detection signal. The quake of the earthquake is thus distinguished from the disturbing oscillations.

For the purpose of distinguishing the earthquake from the other disturbing oscillations, the seismosensitive element is required to have different response characteristics between a frequency band of the earthquake oscillation and the other frequency band. For example, an oscillational acceleration reaches 120 gal when the sinusoidal wave whose frequency is 5 Hz or below is applied to the seismosensitive element. The acceleration of 120 gal corresponds to the Seismic intensity 5. When such a sinusoidal wave corresponding to the acceleration of 120 gal is applied to the seismosensitive element, the microcomputer is desirable to deliver the detection signal indicative of occurrence of earthquake to thereby operate a safety device such as the gas shutoff valve. Furthermore, the microcomputer is desirable not to make an erroneous response when the acceleration responsive device is subjected even to the acceleration of 300 gal at the frequency of 6 Hz or above.

The conventional control devices such as the gas flowmeter are usually equipped outdoors for the purpose of inspection thereof. For example, the control device is mounted on an outer wall of a building with piping. Accordingly, the control device faces a passage or a playing yard for children. The body of a passenger, his or her luggage, a bicycle or a ball with which children is playing catch sometimes collides against the control device. In such a case, an impulse wave whose acceleration ranges between from 1,000 to 3,000 gal is produced although the acceleration takes different values to some extent depending upon a space between support positions of a metal fixture for the gas piping. Subsequently to the above-described production of the impulse wave, the acceleration starts to be damped from about 1,000 gal. The damped oscillation contains a wave which is approximate to a sinusoidal wave and whose frequency is about 10 Hz. The experiments carried out by the inventors show that such oscillation acceleration as described above is applied to the gas flowmeter.

The signal delivered from the seismosensitive element theoretically has a period in accordance with a period of oscillation applied to the element. Accordingly, when the oscillation frequency is about 10 Hz as in the above-described case, the period of either "on" or "off" signal does not reach 40 milliseconds, so that the microcomputer does not take the oscillation for an earthquake.

However, the inertia ball is enclosed in a circular cylindrical or hemispheric housing as in the above-described seismosensitive element. The inertia ball sometimes rotates along the inner wall of the housing or the electrode when the impulse applied to the element is large. In this case, because of the difference between the frequency of the applied oscillation and a resonance frequency depending upon the elasticity of the electrode, the configuration of the housing bottom and the mass of the inertia ball, the motion of the inertia ball is shifted to an incomplete circular motion resulting in an elliptic or polygonal trajectory in a stage that the oscillation damps. Consequently, the period of the output signal of the seismosensitive element does not always depend upon the frequency of the applied oscillation, or rather, the time length of the "on" or "off" signal corresponds to the condition for determination of an earthquake in the stage that the oscillation damps, which makes it difficult to distinguish the earthquake from the disturbing oscillation.

SUMMARY OF THE INVENTION

Therefore, an object of the present invention is to provide an acceleration responsive switch which can provide an oscillation detection signal on the basis of which an oscillation applied thereto can be reliably distinguished between an earthquake and the other disturbing oscillation and to provide a method of making the switch.

A second object of the invention is to provide an acceleration responsive switch wherein a stable operation can be expected even in an environment in which the ambient temperature changes to a large extent and to provide a method of making the switch.

In one aspect, the present invention provides an acceleration responsive switch comprising a hermetic receptacle including a bottomed cylindrical, electrically conductive housing having an inclined face formed on an inner bottom face so as to gently rise concentrically outwardly substantially from the center of the bottom and a header fixed to the housing to hermetically close an open end of the housing and having a through-aperture. A lead terminal is fixed in the through-aperture of the header so as to extend through the header and so as to be electrically insulated from the housing. A contact member is secured to an end of the lead terminal located in the housing and includes a plurality of feather portions arranged radially to be approximately concentric with the housing. Each feather portion has a predetermined elasticity. An electrically conductive inertia ball is enclosed in the hermetic receptacle so as to be capable of rolling on the inner bottom face of the housing. The inertia ball is located substantially at the center of the inner bottom face of the housing in a normal attitude thereof in a stationary state due to the inclination of the inner bottom face of the housing. The inertia ball moves to a position spaced from the center of the inner bottom face of the housing when subjected to an oscillation, so that the inertia ball contacts one or more of the feather portions of the contact member, thereby electrically conducting between the feather portions and the housing. The invention is characterized by an oscillation damping liquid contained in the hermetic receptacle with the inertia ball. The oscillation damping liquid has a viscosity suitable to apply resistance to the inertia ball so that the inertia ball ceases rotating when an external oscillation previously applied to the inertia ball stops. The oscillation damping liquid is previously degassed so that impurities dissolved therein are eliminated.

According to the above-described acceleration responsive switch, the oscillation damping liquid prevents the movement of the inertia ball from developing in the housing to an undesirable rotational motion due to the component force intersecting the direction in which the oscillation is applied to the inertia ball. Consequently, since the inertia ball comes into contact with the feather portions of the contact member continuously, rotating, undesirable generation of a continuous "on" signal similar to one generated when the equipment on which the acceleration responsive device is mounted has overturned.

Furthermore, if the movement of the inertia ball should develop to the undesirable rotational motion, the rotational motion would be terminated in a short period of time by the oscillation damping liquid. Consequently, the condition for determination of an earthquake cannot be satisfied by the time length and the number of times of generation of the "on" on signal generated during that short period of time.

The oscillation damping liquid preferably contains water the content of which is determined so that electrical conductivity between the housing and the contact member with the inertia ball interposed therebetween is not substantially prevented by freezing of the water. More specifically, the oscillation damping liquid preferably contains a mixture of hydrocarbon as a main liquid and alcohol as an additive liquid or a mixture of a main liquid in which alcohol does not almost dissolve and alcohol added to the main liquid. Furthermore, an amount of oscillation damping liquid poured into the housing may be determined so that the liquid level is in contact with the contact member.

In a second aspect, the invention provides a method of making an acceleration responsive switch comprising the step of obtaining a bottomed cylindrical, electrically conductive housing having an inclined face formed on an inner bottom face so as to gently rise concentrically outwardly substantially from the center of the bottom, the step of obtaining a header fixed to an open end of the housing and having a through-aperture in which a lead terminal is hermetically fixed so as to extend through the header and so as to be insulated from the header, the lead terminal having an end to which a contact member including a plurality of feather portions arranged radially to be approximately concentric with the housing and each having a predetermined elasticity is secured, the step of enclosing an electrically conductive inertia ball in the housing. The method further comprises the step of accommodating an oscillation damping liquid in the housing, the oscillation damping liquid having a viscosity suitable to apply resistance to the inertia ball so that the inertia ball ceases rotating when an external oscillation previously applied to the inertia ball stops, the step of reducing pressure in the interior of the housing accommodating the inertia ball and the oscillation damping liquid therein to a predetermined value and subsequently, filling the housing with a pollution preventing gas, the interior of the housing being maintained in a pressure reduced state for a predetermined period of time in the step of reducing pressure in the interior of the housing so that a gas dissolved in the oscillation damping liquid in the housing is discharged out of the housing, and the step of hermetically securing the header to the open end of the housing so that the contact member is located in the housing, subsequently to the step of filling the housing with the pollution preventing gas.

BRIEF DESCRIPTION OF THE DRAWINGS

Other objects, features and advantages of the present invention will become clear upon reviewing the following description of preferred embodiments thereof, made with reference to the accompanying drawings, in which.

DESCRIPTION OF THE PREFERRED EMBODIMENTS

Figure 1:
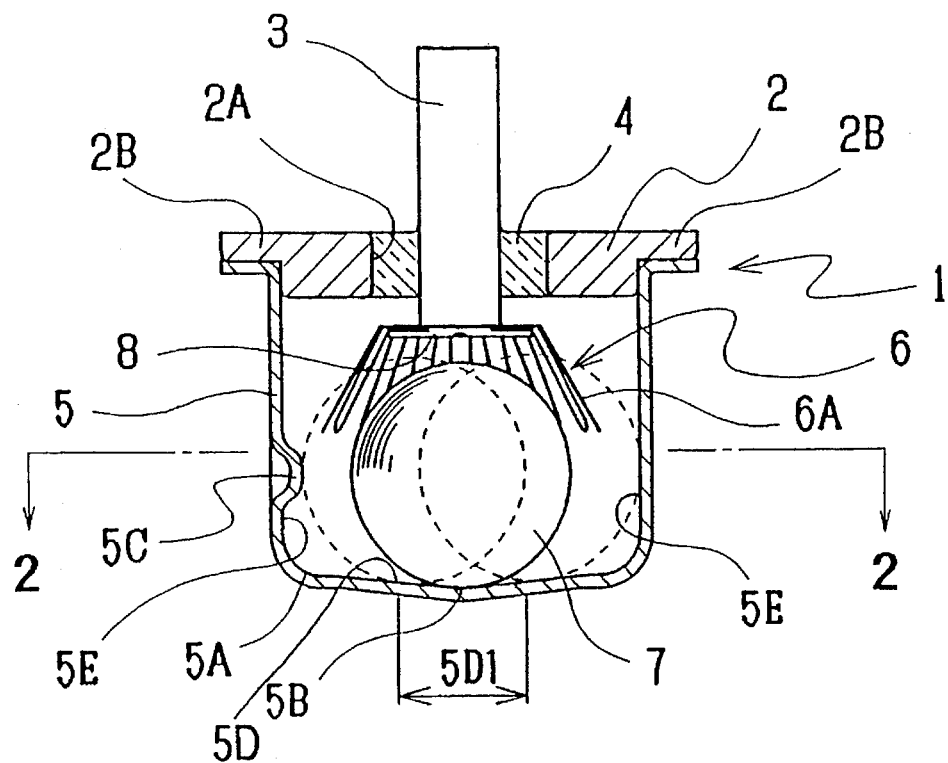
FIG. 1 is a longitudinal sectional view of a first embodiment of an acceleration responsive switch in accordance with the present invention.

A first embodiment of the present invention will now be described with reference to FIGS. 1 and 2. An acceleration responsive switch 1 comprises a circular metal header 2 having a through-aperture 2A formed in the center thereof. An electrically conductive lead terminal 3 is hermetically secured in the through-aperture 2A by an electrically insulative filler 4 such as glass so as to extend therethrough. The header 2 has a peripheral flange 2B to which an open end of a bottomed cylindrical metal housing 5 is hermetically secured by way of ring projection welding, so that the header 2 and the housing 5 constitutes an hermetic receptacle in which gases and moisture are prevented from penetrating into and leaking out of it. An inner bottom face 5A of the housing 5 includes an inclined or conical face 5D gently rising concentrically outwardly substantially from the center of the bottom.

An electrically conductive contact member 6 is conductively secured to the distal end of the lead terminal 3 located in the housing 5. The contact member 6 has a plurality of contact portions or feather portions 6A each having sufficient elasticity. The feather portions 6A are arranged radially to be approximately concentric with the housing 5. Each feather portion 6A is formed of a phosphor bronze sheet having a thickness of 0.01 to 0.03 millimeters when an inertia ball 7 which will be described later has the mass of 0.7 gram, for example.

The electrically conductive inertia ball 7 is enclosed in the housing 5. In a normal attitude in a stationary state, the inertia ball 7 is located on a rest portion 5B which is near the center of the conical face 5D of the housing bottom. The inertia ball 7 may be an electrically conductive solid ball formed of iron, copper or alloy of them. When subjected to an oscillation with a predetermined acceleration or above due to an earthquake or the like, the inertia ball 7 is capable of rolling on the conical or inclined face 5D of the housing bottom face until it comes into contact with an inner side wall 5E or a protrusion 5C which will be described later, as shown by dotted line in FIG. 1. The inertia ball 7 is further capable of coming into contact with and departing from one or more of the feather portions 6A of the contact member 6 in the course of its rolling motion. Consequently, the inertia ball 7 provides for an electrical on-off action. A protector 8 is secured to the underside of the portion of the contact member 6 at which portion it is secured to the lead terminal 3. The protector 8 prevents deformation of the contact member 6 due to the collision of the inertia ball 7 against it.

Figure 2:
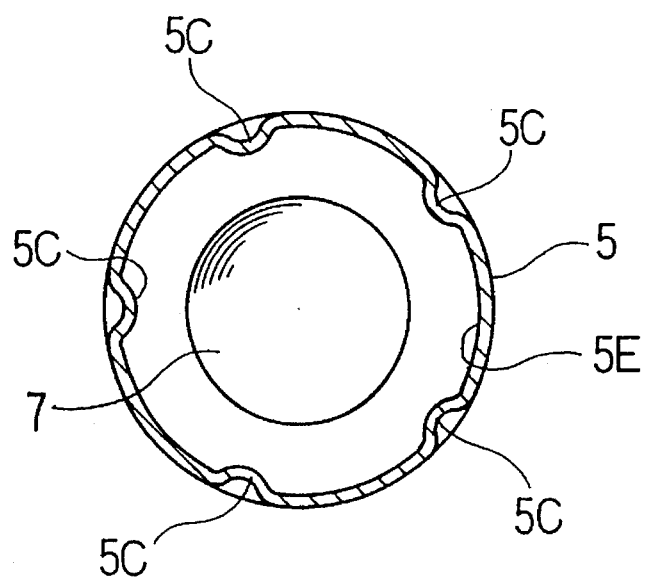
FIG. 2 is a sectional view of the acceleration responsive switch taken along line 2—2 in FIG. 1.
Figure 3:
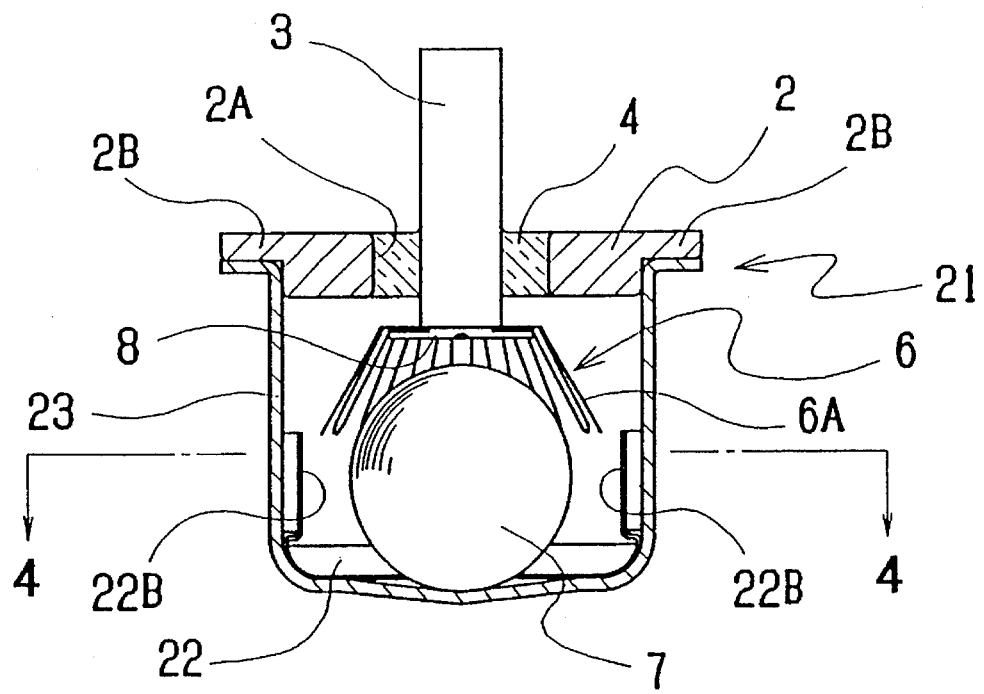
FIG. 3 is a longitudinal sectional view of a second embodiment of an acceleration responsive switch in accordance with the present invention.
Figure 4:
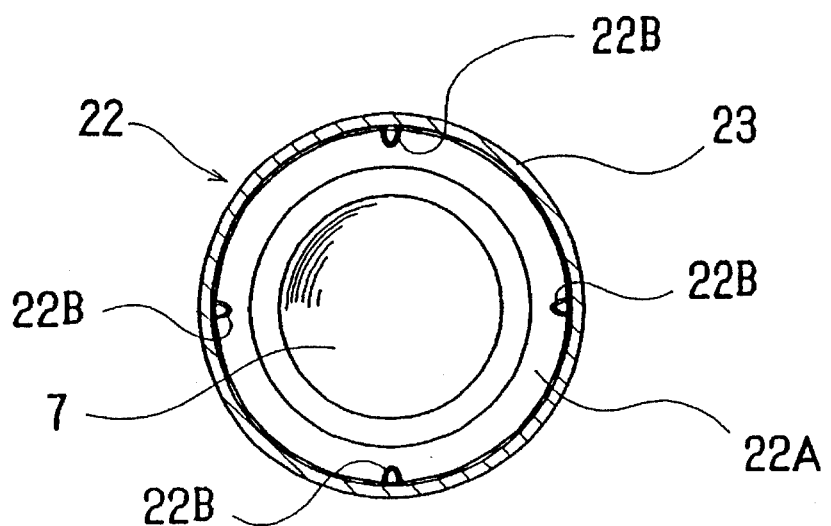
FIG. 4 is a sectional view of the acceleration responsive switch taken along line 4—4 in FIG. 3.

Five protrusions 5C each serving as a collision portion are formed circumferentially at regular intervals on the inner side wall 5E of the housing 5, as shown in FIG. 2. The protrusions 5C are formed by way of pressing, for example. The number of the protrusions 5C depends upon a resonance frequency of the inertia ball 7 which further depends upon the size of the housing 5 or the inertia ball 7, the material of the inertia ball 7 and the like. The protrusions 5C are formed at the regular intervals on the circumferential face of the inner side of the housing 5 along which face the inertia ball 7 rolls, sliding on the feather portions 6A of the contact member 6. The number of the protrusions 5C may be two, three, four or more than five. Furthermore, the collision portion such as the protrusion 5C may take the form of a column extending upwardly from the outer portion of the bottom of the housing 5 if the configuration of a rolling section 5D1 corresponding to a range in which the inertia ball 7 actually moves until colliding against the inner side wall of the housing 5 is not influenced by the pressing or the like. Furthermore, an amount of protrusion of each protrusion 5C toward the interior of the housing 5 is selected so that the contact of the inertia ball 7 with the contact member 6 is not disturbed even if the inertia ball 7 is located at a position where it is capable of coming into contact with the protrusion 5C and so that the direction of the inertia ball 7 in the circular motion can be reliably changed without direct contact of the contact member 6 with the protrusion 5C. Additionally, the circumferential width of the protrusion 5C is desirable to be as small as possible, so that the moving distance of the inertia ball 7 can be prevented from being reduced by the head-on collision of the inertia ball 7 against the protrusion 5C during its reciprocal oscillation or that is, the time length of the signal generated by the acceleration responsive switch can be prevented from being reduced. Moreover, the inertia ball 7 is repelled back to the side wall 5E of the housing 5 when colliding against the protrusion 5C obliquely but not frontally. Accordingly, since the reduction in the moving distance of the inertia ball 7 can be prevented, the time period of contact of the inertia ball 7 with the contact member 6 is not almost influenced.

The operation of the acceleration responsive switch will be described. As described above, the inertia ball 7 is located on the rest portion 5B in its normal attitude in the stationary state. Since the inertia ball 7 is not in contact with the contact member 6 in this state, electricity is not conducted between the lead terminal and the housing 5 or the header 2. Consequently, no signal is delivered.

When the acceleration responsive switch 1 is subjected to a transverse acceleration of a predetermined value or above, the inertia ball 7 rolls on the inclined face 5D of the housing bottom face 5A, coming into contact with one or more of the feather portions 6A of the contact member 6. Consequently, since electricity is conducted between the contact member 6 and the housing 5, an electric path is formed by the lead terminal 3, the contact member 6, the inertia ball 7, the housing 5 and the header 2 sequentially so that a signal is delivered.

The motion of the inertia ball 7 is theoretically a reciprocating motion along the center line of the housing 5 depending upon the direction of the oscillation applied to the inertia ball 7 when an oscillation mode is a reciprocating motion in a fixed direction during the rolling of the inertia ball 7. Actually, however, a slight acceleration component having the direction intersecting that of the applied oscillation sometimes acts on the inertia ball 7 because of inclination in the contact of the inertia ball 7 with the feather portions 6A or unbalance of slightly concave and convex portions on the inclined face 5D. Such a transverse component force of the acceleration causes the inertia ball 7 to deviate from the center of the housing 5, whereupon the motion of the inertia ball 7 sometimes develops to a rotational motion with circular, elliptic or 8-shaped loci. Upon occurrence of such a rotation motion, the inertia ball 7 continuously comes into contact with the feather portions 6A and accordingly, an output signal from the lead terminal 3 becomes a continuous signal having the time length of one second or above, on which continuous signal occurrence of an abnormal condition is determined. Furthermore, the contact of the inertia ball 7 with the feather portions 6A becomes intermittent in the stage that such a rotational motion of the inertia ball 7 dampens. Consequently, a detection signal with a time length and such generation intervals similar to those of an earthquake is accidentally determined erroneously to be indicative of occurrence of an earthquake. A microcomputer erroneously determines occurrence of an earthquake in the case where the above-described abnormal condition occurs when the frequency of the oscillation applied to the acceleration responsive switch 1 is in the range between 7 and 10 Hz.

In the above-described acceleration responsive switch, however, the protrusions 5C each serving as the collision portion are formed on the side wall 5E of the housing 5. The inertia ball 7 collides against the protrusion 5C when initiating the rotational motion, so that the direction of its motion is suddenly turned. As a result, the contact of the inertia ball 7 with the contact member 6 is temporarily interrupted so that the continuous generation of the "on" signal is avoided. At the same time, the collision of the inertia ball 7 against the protrusion 5C rapidly reduces the kinetic energy of the inertia ball 7 so that the rotational motion of the inertia ball 7 is terminated in a short period of time, whereby its normal reciprocating motion approximate to the linear motion can be recovered. Thus, the time length and the number of times of generation of the "on" or "off" signal can be prevented from satisfying the condition of determination of an earthquake by the termination of the rotational motion of the inertia ball 7 in such a short period of time.

Experiments carried by the inventors show that it takes 15 seconds or less to terminate the rotational motion of the inertia ball 7 in the acceleration responsive switch having the protrusions 5C on the housing 5 while it takes 20 to 30 seconds in the case where the housing is not provided with such protrusions 5C. The "on" signal with a period of 40 milliseconds may be generated during termination of the rotational motion of the inertia ball 7 in the system wherein the microcomputer determines occurrence of an earthquake when the "on" and "off" signals each having the period of 40 milliseconds or above are generated. However, the rotational motion of the inertia ball 7 is reduced to a slight oscillation without contact with the contact member 6 before the signals are generated three times.

Figure 5:
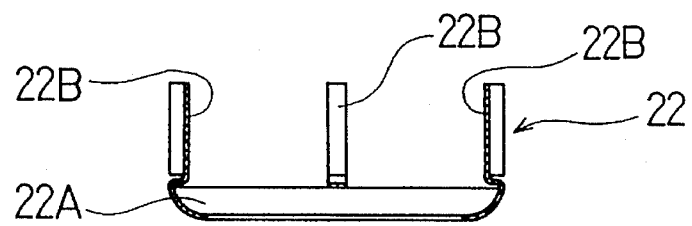
FIG. 5 is a longitudinal sectional view of a collision member employed in the acceleration responsive switch of the second embodiment.
Figure 6:
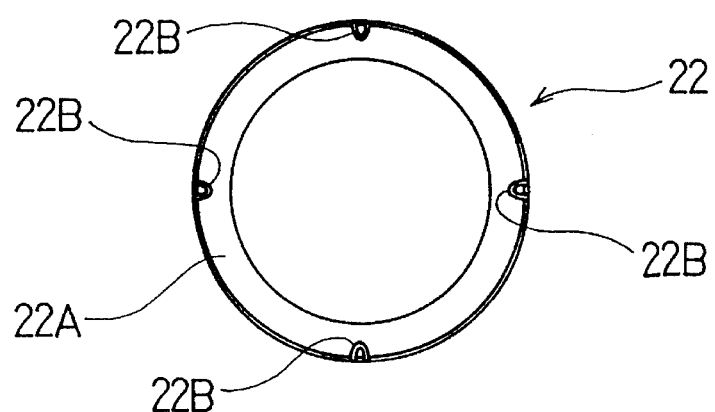
FIG. 6 is a plan view of the collision member employed in the acceleration responsive switch of the second embodiment.

The collision portion should not be limited to the protrusion 5C as shown in FIG. 1. FIGS. 3 to 6 illustrate a modified form of the collision portion as a second embodiment of the invention. As in the foregoing embodiment, the collision member 22 in the second embodiment suddenly changes the direction of motion of the inertia ball 7 when its motion is turned to the rotational motion and reduces the kinetic energy of the inertia ball 7. The same reference numerals are employed for the similar parts in the second embodiment as in the first embodiment. The collision member 22 is formed of iron, its alloy or plastics. The collision member 22 comprises a ring-shaped base 22A and collision portions 22B formed circumferentially at regular intervals on the base 22A, as shown in FIGS. 5 and 6. The collision member 22 is inserted into the housing 5 to be secured in position so that the collision portions 22B are located at predetermined positions. Since the rolling section 5D1 (see FIG. 1) for the inertia ball 7 is located inside the ring-shaped base 22A, the collision member 22 does not influence the basic rolling characteristic of the inertia ball 7.

Each collision portion 22B of the collision member 22 has the same effect as that of each protrusion 5C in the foregoing embodiment. In particular, since the collision member 22 is a part separate from the housing 23, the collision member 22 can be formed of a material thinner or elastically more deformable than that of the housing 23 so that more kinetic energy of the inertia ball 7 is absorbed by each collision portion 22B than by each protrusion 5C which is nearly a rigid body. Consequently, the rotational motion of the inertia ball 7 can be terminated more quickly than in the first embodiment.

Figure 7:
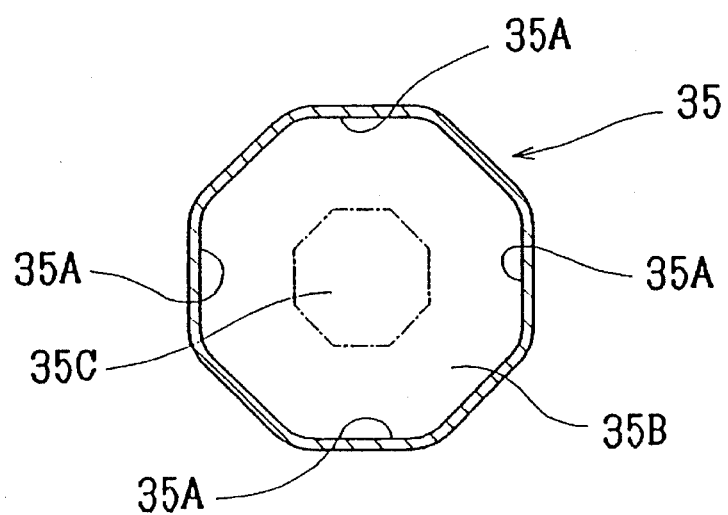
FIG. 7 is a sectional view similar to FIG. 2, showing a third embodiment of an acceleration responsive switch in accordance with the present invention.

FIG. 7 illustrates a third embodiment of the invention. In the third embodiment, the side wall 35A of the housing 35 is polygonal or its curvature is varied so that the housing 35 has a non-circular section, whereby the side wall 35A substantially serves as the collision portion. Consequently, the rotational motion of the inertia ball 7 along the inner circumferential face of the housing 35 becomes unstable, thereby being terminated. In this construction, too, the housing bottom face 35B includes the rolling section or inclined face 35C as in the construction shown in FIG. 1. Furthermore, the distance of the rolling motion of the inertia ball 7 differs depending upon the direction of its motion. However, the detection of an earthquake can be performed substantially without hindrance when the diameter of the inertia ball 7 and the maximum and minimum diameters of the inner circumferential face of the housing 35 relative to each other are determined so that the difference of the time length of the "on" signal is minimized.

Figure 8:
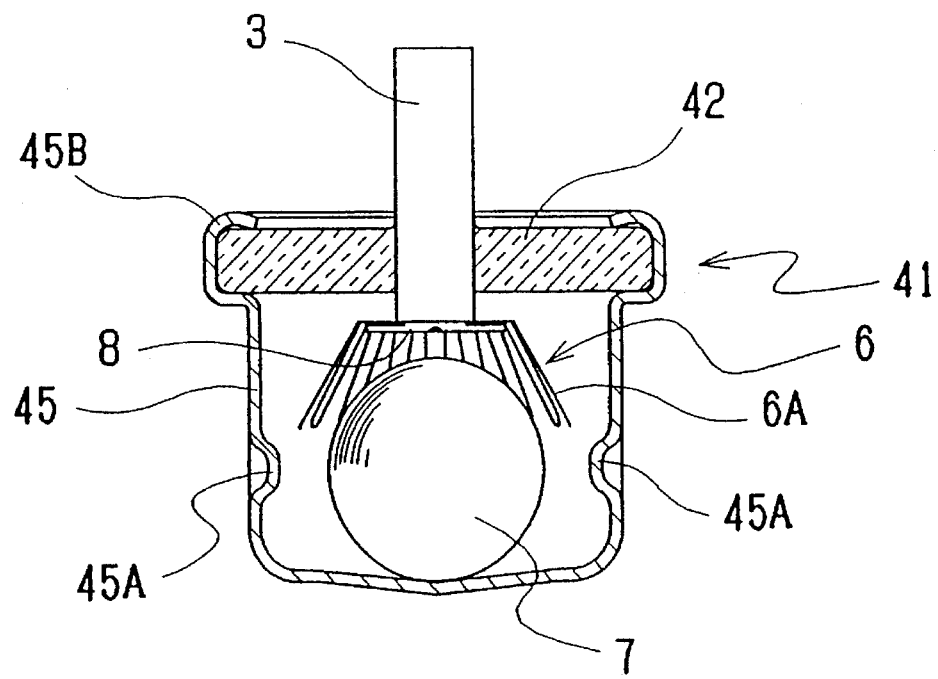
FIG. 8 is a longitudinal sectional view of a fourth embodiment of an acceleration responsive switch in accordance with the present invention.

FIG. 8 illustrates a fourth embodiment of the invention. The acceleration responsive switch 41 comprises a header 42 formed of an electrically insulating material such as plastics or ceramic. The header 42 has a generally central through-aperture in which the lead terminal 3 is secured. The configuration of the bottom of the housing 45 and the protrusions 45A are the same as those shown in FIG. 1. The housing 45 has a flange or securing portion 45B formed on its open end. The header 42 is secured to the open end of the housing 45 by way of crimping. Accordingly, since the welding work is not necessitated, the assembly of the acceleration responsive switch can be rendered easier.

The receptacle comprising the housing 45 and the header 42 is not hermetically closed in the fourth embodiment. There is no inconvenience when the acceleration responsive switch 41 is disposed in a vacuum or in an inert atmosphere. Furthermore, the acceleration responsive switch 41 can be disposed in an atmospheric air when the surfaces of the inertia ball 7, the portion of the inner face of the housing 45 brought into contact with the inertia ball 7 and the contact member 6 are treated or when these parts are formed from a material not corroding in the atmosphere. Additionally, the acceleration responsive switch 41 can be used as a seismosensitive device when the header 42 is secured to the securing portion 45B with an adhesive so that the receptacle is sealed, as will be described later.

Figure 9:
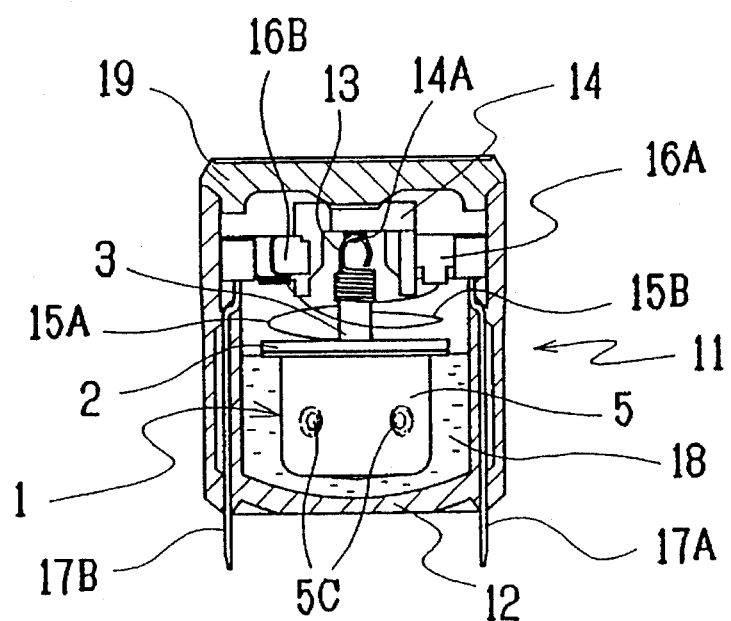
FIG. 9 is a longitudinal sectional view of a seismosensitive element employing the acceleration responsive switch in accordance with the present invention.

FIG. 9 shows a case where the acceleration responsive switch serving as a seismosensitive element is mounted on a gas flowmeter having an integrated microcomputer. The seismosensitive device 11 comprises an outer case 12 enclosing therein the acceleration responsive switch 1. A hook 13 provided on the lead terminal 3 is hung on a hanger 14A of a support 14 mounted in the outer case 12 so that the acceleration responsive switch 1 is rockably suspended and so that the gravity causes the acceleration responsive switch 1 to assume its normal attitude. One ends of sufficiently flexible leads 15A and 15B are connected to the header 2 and the lead terminal 3 respectively. The other ends of the leads 15A, 15B are connected through connecting terminals 16A and 16B to conductive terminals 17A and 17B provided in the outer casing 12 by way of insert molding respectively. The outer case 12 is filled with a predetermined amount of a viscous fluid 18. An outer lid 19 is secured to an open end of the outer case 12 with such a level of tightness that the viscous fluid 18 is prevented from leaking out of the outer case 12.

The seismosensitive device 11 is directly mounted on a printed circuit board of a control device and connected by the conductive terminals 17A, 17B to the wiring on the circuit board. The attitude of the acceleration responsive switch 1 mounted on the circuit board has a great influence on its operating characteristics. For example, the responsive acceleration varies by about 20 gal when the acceleration responsive switch 1 is inclined by one degree relative to its normal attitude. Thus, since a high level of accuracy is required in mounting the acceleration responsive switch 1 on the circuit board, it is difficult to directly mount it on the circuit board. However, the acceleration responsive switch 1 is suspended in the outer case 12 in the above-described seismosensitive device 11. Accordingly, the self-weight causes the acceleration responsive switch 1 to assume its normal attitude when the attitude of the seismosensitive device mounted on the circuit board is within an allowable range of inclination. Thus, since the degree of accuracy in the mounting of the seismosensitive device is reduced, the mounting work can be performed more easily.

Furthermore, the outer case 12 is filled with the viscous fluid 18 having the preselected viscosity, such as the silicon oil together with the acceleration responsive switch 1. Consequently, the acceleration responsive switch 1 delivers an operation signal in response to overturn or sudden inclination of the equipment on which the seismosensitive device is mounted or the oscillation due to an earthquake. Additionally, the viscosity of the viscous fluid 18 is selected so that the acceleration responsive switch returns back to the normal attitude in 30 seconds, for example, when the inclination of the seismosensitive device 11 changes.

Figure 10:
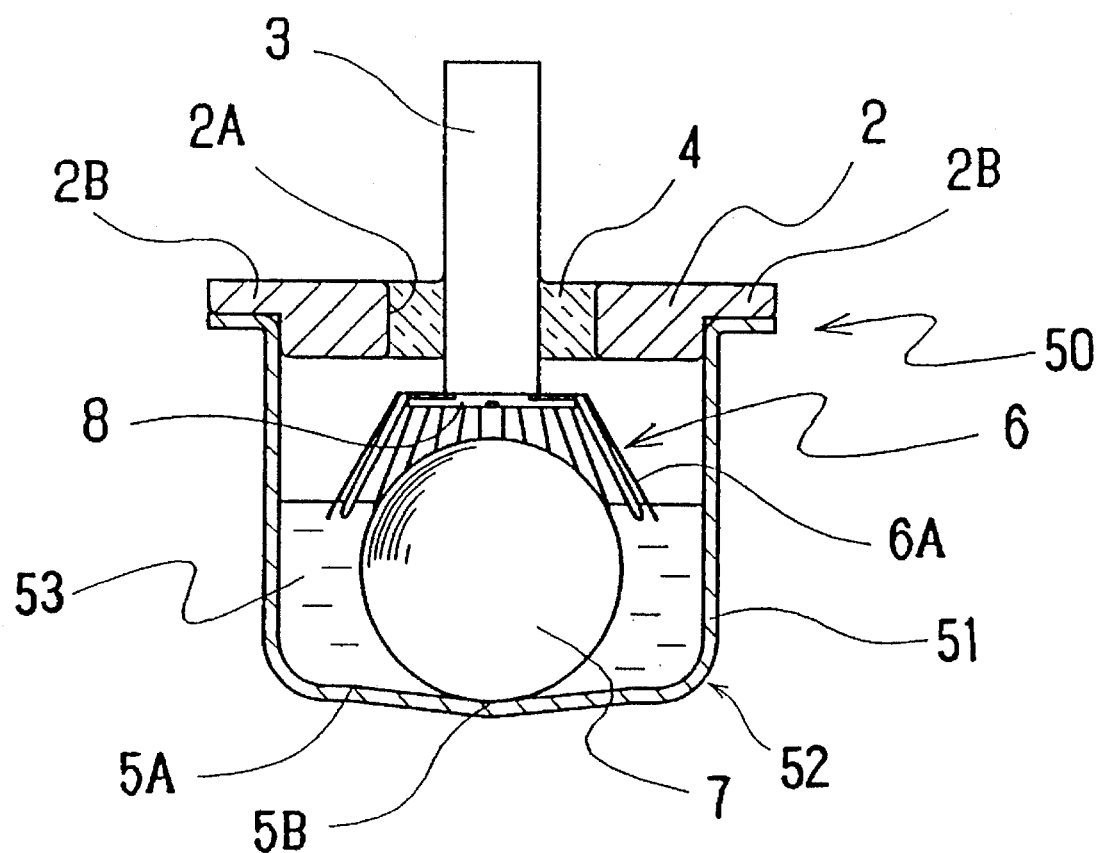
FIG. 10 is a longitudinal sectional view of a fifth embodiment of an acceleration responsive switch in accordance with the present invention.

FIG. 10 illustrates a fifth embodiment of the invention. The acceleration responsive switch 50 comprises a housing 51 which is substantially the same as shown in FIG. 1 with the protrusions 5C eliminated, a header 2. The housing 51 and the header 2 constitute an hermetic receptacle 52 accommodating the oscillation damping liquid 53 and the inertia ball 7.

The oscillation damping liquid 53 is an inert liquid and desirably one having a relatively low viscosity and small surface tension, for example, a fluorine inert liquid such as type FC-75 sold under the trademark of FLUORINERT by 3M, U.S.A. The oscillation damping liquid 53 accommodated in the receptacle 52 preferably ranges between an amount in which one fourth of the diameter of the inertial ball 7 is immersed in the liquid and an amount in which the whole inertia ball 7 is immersed. A gas is enclosed over the free surface of the oscillation damping liquid 53 in the receptacle 52 so that the receptacle 52 can be prevented from being deformed by the expansion and contraction of the liquid 53 due to temperature changes.

The acceleration responsive switch 50 normally operates in the same manner as shown in FIG. 1. Particularly, even when a component force intersecting the direction of an external oscillation is applied to the inertia ball 7, the development of the motion of the inertia ball 7 in the direction of the component force can be restrained by the viscosity of the oscillation damping liquid 53. Consequently, when the inertia ball 7 is rotated in the hermetic receptacle 52 in response to the oscillation whose frequency ranges 7 to 10 hz, the acceleration responsive switch 50 can be prevented from delivering the signal on which the microcomputer erroneously determines occurrence of an earthquake or overturn of the equipment.

In one experiment, 0.2 to 0.3 gram of oscillation damping liquid whose dynamic viscosity ranges 3 to 0.4 centistokes at the temperature of −30° to 60° C. is used. The inertia ball 7 starts to roll when the sinusoidal oscillation applied to the acceleration responsive device 51 in which the oscillation damping liquid is not used reaches the acceleration of 110 gal. On the other hand, the inertia ball 7 starts to roll at the acceleration of 120 gal when the oscillation damping liquid 53 is accommodated in the receptacle 52. This acceleration is in the range of 80 to 250 gal, which range corresponds to the Seismic intensity 5. Thus, the acceleration responsive switch 50 poses no problem with respect to its acceleration responsiveness.

In another experiment, the frequency of the applied oscillation ranges 7 to 8 Hz and its acceleration is increased to 300 to 500 gal. When the oscillation damping liquid 53 is not used, the inertia ball 7 is subjected to a slight acceleration component induced in the direction of a component force intersecting the direction of the applied oscillation and its motion is developed in the direction of the component force. On the other hand, such undesirable motion of the inertia ball 7 as mentioned above is not almost produced and the inertia ball 7 moves substantially only in the direction of the applied oscillation when the oscillation damping liquid 53 is accommodated in the receptacle 52. A threshold value of the acceleration causing the inertia ball 7 to start its motion can be adjusted by changing the configuration of the bottom of the housing 5 and the like.

Since the oscillation damping liquid 53 is accommodated in the receptacle 52, the rotational motion of the inertia ball 7 can be terminated in a short period of time even if the inertia ball 7 should cause the rotational motion.

Experiments carried by the inventors show that it takes 10 seconds or less to terminate the rotational motion of the inertia ball 7 in the acceleration responsive switch having the oscillation damping liquid 53 accommodated in the receptacle 52 while it takes 20 to 30 in the case where such oscillation damping liquid is not accommodated in the receptacle. The "on" and "off" signals each having the period of 40 milliseconds or above are not generated three times for three seconds during such a short period of time as described above. Consequently, the microcomputer can be prevented from erroneously determining occurrence of an earthquake.

Furthermore, the inert oscillation damping liquid 53 accommodated in the hermetic receptacle 52 prevents soil from cohering onto the surfaces of the contact member 6 and the inertia ball 7. Furthermore, the inertia ball 7 agitates the oscillation damping liquid 53 during the oscillation, thereby causing it to flow in the receptacle 52. Consequently, since the soil can be removed easily, the amplitude of the signal is rendered stable and the initial responsiveness of the acceleration responsive switch can be maintained for a long period of time.

A first method of making the acceleration responsive switch 50 will be described. Since the working voltage applied to the acceleration responsive switch of the above-described type is usually low and the current is feeble, the contact resistance changes to a large extent when an oxide film is produced on the surfaces of the contact member or the inertia ball or the inner surface of the receptacle. For the purpose of preventing formation of the oxide film, the receptacle 52 is hermetically closed, and a pollution preventing gas preventing oxidation or the like, for example, an inert gas such as helium or argon, nitrogen or hydrogen is enclosed in the receptacle 52 by replacement of the atmosphere in the receptacle 52. Airtightness is preferably inspected with a helium detector when the helium is particularly enclosed in the receptacle 52.

In replacement of the atmosphere in the receptacle with the pollution preventing gas, the pressure in the interior of the receptacle is reduced to 0.05 torr or below, that is, about one fifteen thousandth atmospheric pressure when the header is welded to the housing in the conventional acceleration responsive switch wherein the oscillation damping liquid is not employed. The interior of the receptacle is thus exhausted and thereafter, the receptacle is filled with the pollution preventing gas. The receptacle is then hermetically closed by way of welding. In the assembly of the acceleration responsive switch in accordance with the present invention, the oscillation damping liquid such as a fluorine inert liquid having low viscosity and high vapor pressure is poured into the receptacle in the atmosphere. In this case, there is a problem that the pressure in the receptacle is reduced far below the vapor pressure of the fluorine inert liquid such that the inert liquid evaporates in a moment when the exhausting operation is performed under a high vacuum as in the conventional manner so that the gaseous atmosphere in the receptacle is replaced by the pollution preventing gas at the conventional rate of replacement. To overcome the problem, the degree of vacuum in filling the receptacle with the pollution preventing gas needs to be rendered higher than the vapor pressure of the inert liquid or the temperature of the inert liquid in enclosing the pollution preventing gas in the receptacle needs to be decreased so that the vapor pressure of the inert liquid is reduced. However, the atmosphere in the receptacle cannot be replaced with the value obtained by the prior art or above when the degree of vacuum is restrained. Furthermore, the whole gas exchanger needs to be maintained at a low temperature in order that the temperature of the inert liquid is decreased, which results in a complicated and large-scaled gas exchanger.

Figure 11:
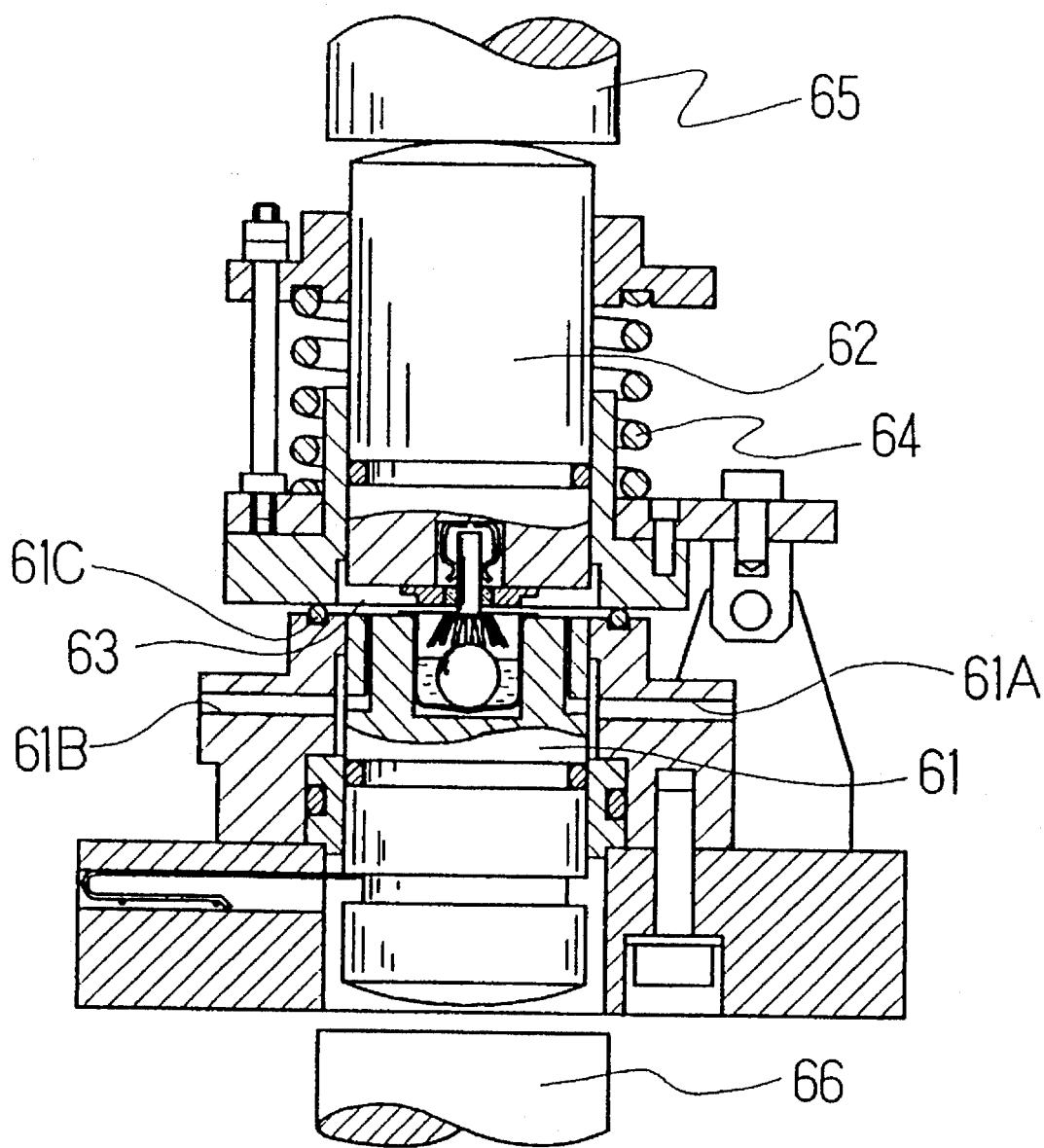
FIG. 11 is a longitudinal sectional view of a welder used in assembly of the acceleration responsive switch in accordance with the present invention.

In view of the foregoing, the exhaust and the gas filling are alternately performed repeatedly in the first method in accordance with the present invention so that the replacement rate of the gas in the receptacle can be increased to substantially the same value as in the case where the exhaust is performed in a high vacuum. One embodiment of the first method will be described with reference to FIGS. 10 and 11. FIG. 11 shows an example of a gas charger used in assembly of the acceleration responsive switch in accordance with the present invention. Although a welder is eliminated in FIG. 11, welding electrodes and their peripheral parts are shown.

A welder used with the gas exchanger is preferably supplied with a secondary side current of a transformer having a primary coil to which electric charge in a capacitor is discharged. Furthermore, the welder includes an upper electrode 65 and a lower electrode 66. A large current is caused to flow through the electrodes when pressure is applied vertically to them. A chamber 63 is defined by lower and upper supports 61 and 62 between the electrodes 66 and 65. Open ends of the lower and upper supports 61 and 62 are hermetically adjacent to each other with an O-ring packing 61C therebetween. An assembly of the contact member 6, the lead terminal 3 and the header 2 and the housing 5 accommodating the inertia ball and the inert liquid are held in the chamber 63. Each of the upper and lower supports 62 and 63 is an electrode capable of conducting a large current therethrough and is formed from a material such as chromium copper, for example.

A path 61A communicating with the chamber 63 is connected via an exhausting electromagnetic valve (not shown) to a vacuum pump, so that air in the chamber 63 is exhausted via the path 61A. A path 61B also communicating with the chamber 63 is connected via a gas filling electromagnetic valve (not shown) to a gas supply source so that the pollution preventing inert gas is supplied via the path 61B into the housing 5.

After header side parts and housing side parts have been held in the chamber 63, the exhausting electromagnetic valve at the side of the path 61A is opened so that air in the chamber 63 is exhausted through the path 61A. The exhausting electromagnetic valve is closed when a predetermined pressure higher than the vapor pressure of the inert liquid is reached in the chamber 63. The gas filling electromagnetic valve at the side of the path 61B is then opened so that the interior of the housing 5 is filled with the pollution preventing inert gas supplied from the supply source such as a gas cylinder via the path 61B and the chamber 63. The gas filling electromagnetic valve is closed when a predetermined amount of the inert gas is reached in the housing 5. A small gap is maintained between the open end of the housing 5 and the peripheral edge of the header 2 until the above-described step is completed.

For example, when the vapor pressure of the inert liquid at the room temperature is 20 torr, the pressure in the housing under the pressure reduced condition needs to be restricted to about 30 torr, that is, about $1/25$ atmospheric pressure. Even when the inert gas is supplied into the housing after the pressure therein is reduced to 30 torr, a gas existing before the exhausting operation or usually, air amounting to $1/25$ is remaining in the housing.

In the present invention, however, the exhausting operation and the gas filling operation are alternately performed repeatedly at predetermined number of times so that the replacement rate of the gas in the housing is increased. For example, when the exhausting operation and the gas filling operation are alternately performed repeatedly three times, the amount of remaining air is reduced to the cube of $1/25$, that is, about $1/15,625$, which value is the same as that obtained when the inert gas is supplied into the housing after the pressure has been reduced to 0.05 torr.

The upper support 62 of the chamber 63 has a double action structure, that is, the upper support 62 keeps the airtightness and is vertically movable. The portion of the upper support member 62 holding the header 2 is held at a predetermined position by a coil spring 64 which has a repulsion against the atmospheric pressure applied thereto. When more force is applied to the portion, the peripheral edge of the header 2 is brought into contact with the open end of the housing 5 with a predetermined contact pressure therebetween. Thereafter, the upper and lower supports 62 and 61 are held between the upper and lower electrodes 65 and 66 of the welder of the condenser discharge type so that a large current is momentarily caused to flow through the electrodes, whereby a hermetic welding called "ring projection welding" is completed. Helium is usually mixed with the inert gas for the leak test. Airtightness is confirmed with a helium detector after the hermetic welding and a confirmed amount of leakage is usually $10^{-9}$ atm.CC/sec or below.

According to the above-described method, even when the pressure in the chamber 63 is higher than the vapor pressure of the inert gas during the exhausting operation, the replacement rate of the gas in the housing can be increased to substantially the same value as in the case where the exhaust is conventionally performed in a high vacuum. Furthermore, since the high vacuum is not necessary in the exhausting operation, the exhaust pump with the lower performance than the conventionally used pump can be used. Thus, an expensive pump is not necessitated.

The pressure for the exhausting operation needs to be lowered as the vapor pressure of the inert gas becomes lower in the above-described first method. Consequently, since the number of times of repeat of the exhausting and gas filling operations is increased, the number of working steps is increased. Accordingly, the number of the chambers 63 needs to be increased for the improvement of the production capacity, which renders the gas exchanger incorporating the welder large-scaled.

To overcome the above-described drawback, the present invention provides a second method of making the acceleration responsive switch. One embodiment of the second method will be described with reference to FIG. 11. In the second method, the gas filling electromagnetic valve and the exhausting electromagnetic valve are simultaneously opened after the header 2 and the housing 5 have been held in the chamber 36, so that the gas supply via the path 61B and the exhaust via the path 61A are simultaneously performed. Consequently, a predetermined gas such as the inert gas is caused to sufficiently flow through the interior of the housing 5, whereby the air in the housing is replaced by the inert gas. Both valves are closed when a predetermined period of time for achievement of a predetermined replacement rate has elapsed or when a predetermined amount of inert gas has been caused to flow through the chamber. Subsequently, the header is hermetically sealed to the housing by the ring projection welding.

According to the second method, the pollution preventing gas such as the inert gas is caused to flow through the housing so that a sufficient replacement occurs, and thereafter, the housing is sealed. Accordingly, the gas replacing work can be performed in a short period of time even though the liquid accommodated in the housing has a high vapor pressure. Consequently, the gas exchanger can be prevented from being large-scaled and the efficiency of the gas filling work can be prevented from being lowered.

A third method of making the acceleration responsive switch in accordance with the present invention will be described. In the third method, when the gas exchanger as shown in FIG. 11 is used, for example, the inertia ball 7 has been enclosed in the housing 51 but the inert liquid 53 has not been accommodated in it when the housing 5 and the header 2 are held in the chamber 63. In this state, the pressure in the chamber 63 is reduced to a high vacuum, for example, 0.05 torr or below, by the exhausting means in the same manner as in the conventional gas replacing work. Thereafter, the pollution preventing gas is supplied into the housing and thereafter, a predetermined amount of the inert liquid 53 is poured into the housing. The housing is then sealed.

According to the third method, the oscillation damping liquid has not been accommodated in the housing when the pressure in it is reduced. Accordingly, since the interior of the housing can be reduced to a sufficiently low pressure, each of the exhausting operation and the gas filling operation can be completed only once, which improves the working efficiency.

Various gases and usually air are dissolved in the inert liquid before it is poured into the receptacle. Even when the gas in the receptacle is replaced by the inert gas and then the receptacle is sealed, there is a possibility that a part of the gas dissolved in the inert liquid, for example, oxygen of the air may from a film on the surfaces of the parts. To prevent this, the third method preferably includes a step of previously removing the dissolved gases from the inert liquid.

To achieve the same effect, the foregoing first method may include a step of maintaining the housing in a pressure reduced state for a predetermined period of time and removing the gases dissolved in the inert liquid 53. In this case, the inert gas may also evaporate. However, a predetermined amount of the inert liquid can reliably be poured into the housing when the amount of the inert liquid is determined in view of its amount evaporated in due consideration of the ambient temperature and the like.

A fourth method of making the acceleration responsive switch will now be described. In the foregoing methods, the gas in the receptacle 52 is replaced by the pollution preventing gas. In the fourth method, however, the gas in the housing is exhausted so that the pressure in it is reduced. Thereafter, the housing is sealed. Consequently, since the space in the receptacle 52 is filled with vapor of the inert liquid 53, the pollution preventing inert gas need not be supplied into the receptacle. Thus, the working efficiency can be improved.

The oscillation damping liquid used in the acceleration responsive switch in accordance with the present invention will now be described. The fluorine inert liquid is employed as the oscillation damping liquid in the foregoing embodiments. Since the fluorine inert liquid has relatively high specific gravity, there is a possibility that the contact pressure between the inertia ball and the housing may be lowered by buoyancy resulting from the liquid. Furthermore, the viscosity of the fluorine inert liquid varies to a large extent depending upon the temperature. When the viscosity of the oscillating damping liquid varies depending upon the temperature, the movability of the inertia ball also varies depending upon the temperature. Consequently, the time length of the signal generated by the acceleration responsive switch varies depending upon the temperature, which may result in erroneous determination of an earthquake. Furthermore, the experiment carried by the inventors confirms that the "on" signal generated by the acceleration responsive switch takes a minute interrupted waveform when the ambient temperature is about 0° C. Such an interrupted waveform is seen when the chattering occurs between the contacts. The experiment also confirms that the reason for the occurrence of the interrupted waveform is that the water contained in the fluorine inert liquid as the oscillation damping liquid freezes and that resultant ice prevents electric conduction between the inertia ball and the contact member.

In view of the above-described problems, a desirable oscillation damping liquid includes alcohol, an alcohol added liquid, water-eliminated hydrocarbon. However, since the alcohol is electrically conductive, it brings about a leakage current. Accordingly, the alcohol is not preferable as the oscillation damping liquid. Furthermore, it is difficult to eliminate the water content from hydrocarbon. The water content cannot be completely eliminated from hydrocarbon.

The inventors provide, as a preferable oscillation damping liquid, a mixed liquid of hydrocarbon or silicon oil as a main liquid and a predetermined amount of a liquid added to the main liquid. The hydrocarbon is preferably pentane, hexane, heptane or toluene. The added liquid is preferably alcohol (methyl or ethyl alcohol) or a silane coupling agent reacting to the water content to thereby produce alcohol. The silane coupling agent is preferably methyltrimethoxysilane or vinyltrimethoxysilane.

In the embodiment, the oscillation damping liquid 53 consists of hexane and 3% of methylalcohol in the mass ratio. The amount of the oscillation damping liquid 53 is determined so that the distal end of each feather portion 6A of the contact member 6 is immersed in the oscillation damping liquid and so that a space in which gases exist is defined over the liquid surface for the purpose of preventing the hermetic receptacle being deformed by the expansion and contraction of the oscillation damping liquid due to temperature changes.

Since at least the distal end of each feather portion 6A of the contact member 6 is in contact with the oscillation damping liquid 53, the conductivity of the alcohol causes a slight current to flow when an amount of alcohol dissolved in the oscillation damping liquid 53. The amount of alcohol is determined so that the insulation resistance between the lead terminal and the housing takes a predetermined value or above when the acceleration responsive switch is stationary. For example, 3% of alcohol in the volume ratio is dissolved in the oscillation damping liquid 53 in the embodiment, so that the above-mentioned slight current can be ignored.

The inventors carried out an experiment to confirm the insulation resistance between the lead terminal 3 and the housing 51 in the case where the methylalcohol is dissolved in hexane as the main liquid and the voltage applied to the acceleration responsive switch is 500 V. When the dissolved methylalcohol is up to 5% in the volume ratio, the insulation resistance takes the value of 1,000MΩ or above. When the dissolved methylalcohol is 8%, the insulation resistance is 200 to 300MΩ. When the dissolved methylalcohol is 10%, the insulation resistance is 40 to 60MΩ. The conductivity is rapidly increased when the dissolved methylalcohol is 10% in the volume ratio. The insulation resistance of the acceleration responsive switch is set for 1,000MΩ or above when the acceleration responsive switch in accordance with the present invention is incorporated in a gas flowmeter having an integrated microcomputer energized from a storage battery for a long period of time. Accordingly, when the oscillation damping liquid employed in the acceleration responsive switch required to be small in size consists of hexane as the main liquid and the methylalcohol dissolved in hexane, an amount of the methylalcohol dissolved in hexane is set for 8% or below in the volume ratio.

The inventors carried out another experiment in which the oscillation damping liquid consists of hexane and ethylalcohol dissolved in hexane. When an amount of the ethylalcohol is up to 8%, the insulation resistance is 1,000MΩ or above. The insulation resistance is about 400MΩ when the amount of the ethylalcohol is 10% and about 50MΩ when the amount of the ethylalcohol is 15%. Accordingly, since an allowable range of amount of ethylalcohol dissolved in hexane is wider than in the methylalcohol, the control of the oscillation damping liquid can be rendered easier when the ethylalcohol is used as the added liquid. Furthermore, the methylalcohol is not soluble in hexane as compared with the ethylalcohol. Sufficient agitation is required when the methylalcohol is dissolved in hexane. Since the ethylalcohol is easily dissolved in hexane, such agitation is not necessary. Consequently, the oscillation damping liquid can be produced more easily when the ethylalcohol is used as the added liquid. The same effect of conductivity at low temperatures can be achieved when the amount of alcohol dissolved in the main liquid is 10% as when it is 8% or below, for example, 3%.

When alcohol is added to silicon oil, both are separated into two phases because the alcohol is almost unsoluble in the silicon oil. Accordingly, when an amount of alcohol in the oscillation damping liquid is large, a part of the alcohol in the oscillation damping liquid agitated at the time of excitation remains between the contact member and the inertia ball, whereby the alcohol presents conductivity. Consequently, the insulation resistance in the stationary state of the switch is reduced to the predetermined value such as 100MΩ or below. However, an experiment carried by the inventors confirms that the insulation resistance in the stationary state of the switch can be increased to the predetermined value such as 100MΩ or above when the amount of alcohol is 10% or below in the volume ratio. Preferably, when the amount of alcohol is 5% or below, the "on" signal generated in excitation of the acceleration responsive switch does not contain intermittent disturbance caused by the conductivity of the alcohol and shorting due to metal-to-metal contact.

When the acceleration responsive switch is operated in the atmosphere of a low temperature such as −30° C., the viscosity of hexane contained in the oscillation damping liquid is increased. The period of the output signal is shortened accordingly. In the present invention, however, the oscillation damping liquid contains alcohol. Consequently, the acceleration responsive switch can reliably generate the "on" signal in response to the seismic wave or a predetermined oscillation and the "on" signal can be prevented from having an intermittent waveform even when the switch is operated in the low temperature atmosphere. Thus, the acceleration responsive switch can reliably generate a stable signal on which the microcomputer is operated in a wide temperature range.

The signal generated by the acceleration responsive switch is thus stable at the atmospheric temperature of 0° C. or below when the oscillation damping liquid contains alcohol while it is unstable when the oscillation damping liquid consists of hydrocarbon such as hexane, fluorine inert liquid or silicon oil. The following is a possible reason for this. The oscillation damping liquid at least containing alcohol is employed in the acceleration responsive switch in accordance with the present invention. Since a slight amount of water content is dissolved in the alcohol and the freezing point of the water content is lowered, the water content is not frozen when the acceleration responsive switch is used in the low temperature atmosphere. Accordingly, the contact between the contact member and the inertia ball is not prevented by the water content. The water content in the oscillation damping liquid reacts to the alkyl group of the silane coupling agent to thereby produce alcohol when a predetermined amount of a silane coupling agent such as methyltrimethoxysilane, methyltriethoxysilane or vinyltrimethoxysilane is dissolved or mixed in the main liquid of the oscillation damping liquid, instead of alcohol or when the oscillation damping liquid consists of a silane coupling agent. Consequently, since the water content is removed, the operation of the switch in the low temperature atmosphere can be rendered reliable. In this case, the oscillation damping liquid should not be limited by alcohol or silane coupling agent. If the conductivity between the contact member and the housing cannot be prevented by the water content in the oscillation damping liquid in the low temperature atmosphere, an isocyanic acid material such as isocyanateethylmethaclate reacting to the water content to thereby produce carbon dioxide may be used.

Figure 12:
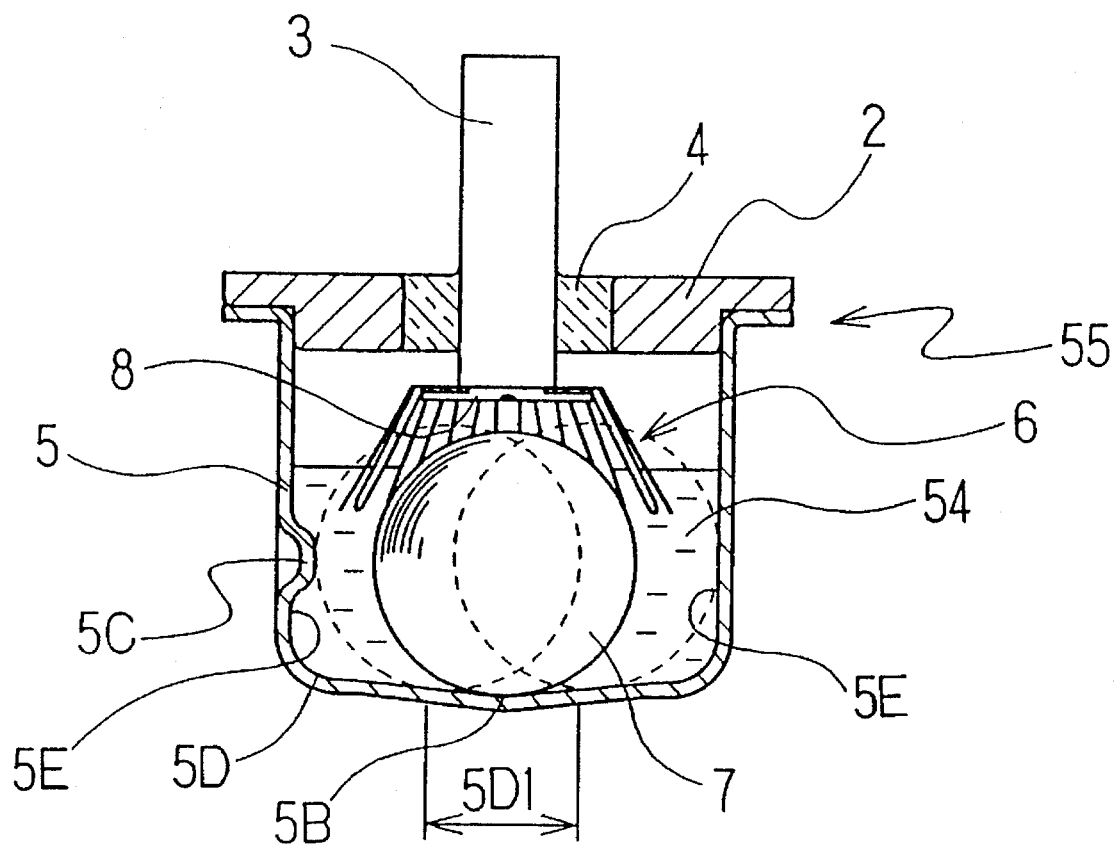
FIG. 12 is a longitudinal sectional view of a sixth embodiment of an acceleration responsive switch in accordance with the present invention.

FIG. 12 illustrates an acceleration responsive switch of a sixth embodiment in accordance with the present invention. The acceleration responsive switch 55 comprises a housing 5 having the same structure as in the first embodiment and the oscillation damping liquid 54 contained in the housing 5. The oscillation damping liquid 54 is a mixture of the main liquid such as the hydrocarbon soluble in alcohol or the silicon oil unsoluble in alcohol and alcohol. In the case where the acceleration responsive switch of the sixth embodiment is used in the low temperature atmosphere, the viscosity of the oscillation damping liquid is increased in the low temperature atmosphere when the viscosity of the oscillation damping liquid is set for a value suitable for the use at the room temperature. Since a force of the oscillation damping liquid preventing the movement of the inertia ball is increased, the period of the contact of the inertia ball with the contact member is shortened even when a predetermined oscillation is applied to the acceleration responsive switch. Consequently, the generated "on" signal doe not have the above-described period of 40 milliseconds. Furthermore, the inertia ball is not brought into contact with the contact member, so that no signal is generated. In the present invention, however, the viscosity of the oscillation damping liquid 54 is selected so as to take a suitable value even when the switch is used in its lowest operating temperature. For example, the dynamic viscosity of hexane as a hydrocarbon is about 1 centistokes at −30° C., and the "on" signal having the predetermined time length is generated by the switch when it is excited by an oscillation having the acceleration of 130 gal. This acceleration is in the above-described range from 80 to 250 gal, which range corresponds to the Seismic intensity 5.

Furthermore, in an impact test at −30° C., the rolling motion of the inertia ball 7 is terminated in 10 seconds or below by the effect of the oscillation damping liquid and the collision portion. Consequently, the microcomputer does not make an erroneous determination as to occurrence of an earthquake even when an impact caused by a ball or the like is applied to the gas flowmeter incorporating the acceleration responsive switch of the embodiment.

On the other hand, the viscosity of the oscillation damping liquid becomes too low in the high temperature atmosphere when the viscosity is selected so as to take the suitable value even in the low temperature atmosphere. Consequently, sufficient restriction on the rotational movement of the inertia ball by the oscillation damping liquid cannot be obtained. However, the reduction in the restriction by the oscillation damping liquid 54 can be compensated by the protrusions 5C formed on the inner surface of the housing 5.

In view of the foregoing, the dynamic viscosity of the oscillation damping liquid 54 containing hexane as the main liquid is 0.4 centistokes or below at the ambient temperature of 60° C. In this case, the inertia ball 7 starts to roll at 120 gal when the acceleration responsive switch is subjected to the oscillation having the sinusoidal waveform.

In an impact test at 60° C., the rolling motion of the inertia ball is terminated in 15 to 20 seconds when the housing has no protrusions while the rolling motion of the inertial ball 7 is terminated in 10 seconds or below by the associated effect of the oscillation damping liquid 54 and the protrusions 5C. Consequently, the microcomputer incorporated in the gas flowmeter on which the switch of the embodiment is mounted does not make an erroneous determination as to occurrence of an earthquake in response to the impact caused by collision of a ball or a man against the gas flowmeter.

In making the acceleration responsive switch 55 of the embodiment, the main liquid of the oscillation damping liquid 54 is uniformly mixed with alcohol, and in this state, the oscillation damping liquid 54 is poured into the housing 5. Consequently, the pouring work can be simplified and the mixing ratio of the alcohol in the oscillation damping liquid can be fixed. For this purpose, a liquid, such as hydrocarbon, in which alcohol is soluble is selected as the main liquid of the oscillation damping liquid. The oscillation damping liquid is poured into the housing after alcohol is previously dissolved in the main liquid at a predetermined mixing ratio. Alternatively, when a liquid, such as silicon oil, in which alcohol is unsoluble is selected as the main liquid, the oscillation damping liquid is agitated so that a uniform alcohol distribution can be obtained. In this state, the oscillation damping liquid is poured into the housing. Or, an amount of the main liquid corresponding to that for one acceleration responsive switch and alcohol is mixed at the predetermined mixing ratio in a cylinder, and then, the mixture is poured into the housing. According to the above-described pouring manners, the assembling apparatus and particularly, the pouring mechanism thereof can be simplified and the assembly of the switch can be rendered easy as compared with the case where two kinds of liquids are separately poured into the housing.

The foregoing disclosure and drawings are merely illustrative of the principles of the present invention and are not to be construed in a limiting sense. Various changes and modifications will become apparent to those of ordinary skill in the art. All such changes and modifications are seen to fall within the true spirit and scope of the inventions as defined by the appended claims.

We claim:

1. An acceleration responsive switch comprising:

a) a hermetic receptacle including a bottomed cylindrical, electrically conductive housing having an inclined face formed on an inner bottom face so as to gently rise concentrically outwardly substantially from a center of the inner bottom face and a header fixed to the housing to hermetically close an open end of the housing and having a through-aperture;

b) a lead terminal hermetically fixed in the through-aperture of the header so as to extend through the header and be electrically insulated from the housing;

c) a contact member secured to an end of the lead terminal located in the housing and including a plurality of feather portions arranged radially to be approximately concentric with the housing, each of the feature portions having a predetermined elasticity;

d) an electrically conductive inertia ball enclosed in the hermetic receptacle so as to be capable of rolling on the inner bottom face of the housing, the inertia ball being located substantially at the center of the inner bottom face of the housing in a normal attitude thereof in a stationary state due to the inclined face of the inner bottom face of the housing, the inertia ball moving to a position spaced from the center of the inner bottom face of the housing when subjected to an oscillation, so that the inertia ball contacts one or more of the feather portions of the contact member, thereby electrically conducting between the feather portions and the housing; and e) an oscillation damping liquid contained in the hermetic receptacle with the inertia ball, the oscillation damping liquid having a viscosity suitable to apply resistance to the inertia ball so that the inertia ball ceases rotating when an external oscillation previously applied to the inertia ball stops, the oscillation damping liquid being previously degassed so that impurities dissolved therein are eliminated.

2. An acceleration responsive switch comprising:
a) a hermetic receptacle including a bottomed cylindrical, electrically conductive housing having an inclined face formed on an inner bottom face so as to gently rise concentrically outwardly substantially from a center of the inner bottom face and a header fixed to the housing to hermetically close an open end of the housing and having a through-aperture;
b) a lead terminal hermetically fixed in the through-aperture of the header so as to extend through the header and be electrically insulated from the housing;
c) a contact member secured to an end of the lead terminal located in the housing and including a plurality of feather portions arranged radially to be approximately concentric with the housing, each of the feather portions having a predetermined elasticity;
d) an electrically conductive inertia ball enclosed in the hermetic receptacle so as to be capable of rolling on the inner bottom face of the housing, the inertia ball being located substantially at the center of the inner bottom face of the housing in a normal attitude thereof in a stationary state due to the inclined face of the inner bottom face of the housing, the inertia ball moving to a position spaced from the center of the inner bottom face of the housing when subjected to an oscillation, so that the inertia ball contacts one or more of the feather portions of the contact member, thereby electrically conducting between the feather portions and the housing; and
e) an oscillation damping liquid contained in the hermetic receptacle with the inertia ball, the oscillation damping liquid having a viscosity suitable to apply resistance to the inertia ball so that the inertia ball ceases rotating when an external oscillation previously applied to the inertia ball stops, the oscillation damping liquid containing water a content of which is determined so that electrical conduction between the housing and the contact member with the inertia ball interposed therebetween is allowed even when the water content is frozen.

3. An acceleration responsive switch comprising:
a) a hermetic receptacle including a bottomed cylindrical, electrically conductive housing having an inclined face formed on an inner bottom face so as to gently rise concentrically outwardly substantially from a center of the inner bottom face and a header fixed to the housing to hermetically close an open end of the housing and having a through-aperture;
b) a lead terminal hermetically fixed in the through-aperture of the header so as to extend through the header and be electrically insulated from the housing;
c) a contact member secured to an end of the lead terminal located in the housing and including a plurality of feather portions arranged radially to be approximately concentric with the housing, each of the feather portions having a predetermined elasticity;
d) an electrically conductive inertia ball enclosed in the hermetic receptacle so as to be capable of rolling on the inner bottom face of the housing, the inertia ball being located substantially at the center of the inner bottom face of the housing in a normal attitude thereof in a stationary state due to the inclined face of the inner bottom face of the housing, the inertia ball moving to a position spaced from the center of the inner bottom face of the housing when subjected to an oscillation, so that the inertia ball contacts one or more of the feather portions of the contact member, thereby electrically conducting between the feather portions and the housing; and
e) an oscillation damping liquid contained in the hermetic receptacle with the inertia ball, the oscillation damping liquid having a viscosity suitable to apply resistance to the inertia ball so that the inertia ball ceases rotating when an external oscillation previously applied to the inertia ball stops, the oscillation damping liquid containing a mixture of hydrocarbon as a main liquid and alcohol as an additive liquid.

4. An acceleration responsive switch according to claim 3, wherein an alcohol content is determined so that insulation resistance between the housing and the contact member is maintained at a predetermined value or above.

5. An acceleration responsive switch comprising:
a) a hermetic receptacle including a bottomed cylindrical, electrically conductive housing having an inclined face formed on an inner bottom face so as to gently rise concentrically outwardly substantially from a center of the inner bottom face and a header fixed to the housing to hermetically close an open end of the housing and having a through-aperture;
b) a lead terminal hermetically fixed in the through-aperture of the header so as to extend through the header and be electrically insulated from the housing;
c) a contact member secured to an end of the lead terminal located in the housing and including a plurality of feather portions arranged radially to be approximately concentric with the housing, each of the feather portions having a predetermined elasticity;
d) an electrically conductive inertia ball enclosed in the hermetic receptacle so as to be capable of rolling on the inner bottom face of the housing, the inertia ball being located substantially at the center of the inner bottom face of the housing in a normal attitude thereof in a stationary state due to the inclined face of the inner bottom face of the housing, the inertia ball moving to a position spaced from the center of the inner bottom face of the housing when subjected to an oscillation, so that the inertia ball contacts one or more of the feather portions of the contact member, thereby electrically conducting between the feather portions and the housing; and
e) an oscillation damping liquid contained in the hermetic receptacle with the inertia ball, the oscillation damping liquid having a viscosity suitable to apply resistance to the inertia ball so that the inertia ball ceases rotating when an external oscillation previously applied to the inertia ball stops, the oscillation damping liquid containing a mixture of a main liquid in which alcohol is substantially unsoluble and alcohol added to the main liquid.

6. A method of making an acceleration responsive switch comprising the steps of:
a) obtaining a bottomed cylindrical, electrically conductive housing having an inclined face formed on an inner bottom face so as to gently rise concentrically outwardly substantially from a center of the inner bottom face;

b) obtaining a header having a through-aperture in which a lead terminal is hermetically fixed so as to extend through the header and so as to be electrically insulated from the header and so as to be electrically insulated from the header, the lead terminal having an end to which a contact member including a plurality of feather portions is secured, the feather portions being arranged radially to be approximately concentric with the housing and each having a predetermined elasticity;

c) enclosing an electrically conductive inertia ball in the housing;

d) accommodating an oscillation damping liquid in the housing, the oscillation damping having a viscosity suitable to apply resistance to the inertia ball so that the inertia ball ceases rotating when an external oscillation previously applied to the inertia ball stops;

e) reducing pressure in an interior of the housing accommodating the inertia ball and the oscillation damping liquid therein to a predetermined value and subsequently, filling the housing with a pollution preventing gas, the interior of the housing being maintained in a pressure reduced state for a predetermined period of time in the step of reducing pressure in the interior of the housing so that a gas dissolved in the oscillation damping liquid in the housing is discharged out of the housing; and f) hermetically securing the header to an open end of the housing so that the contact member is located in the housing, subsequently to the step of filling the housing with the pollution preventing gas.

7. A method of making an acceleration responsive switch comprising the steps of:

a) obtaining a bottomed cylindrical, electrically conductive housing having an inclined face formed on an inner bottom face so as to gently rise concentrically outwardly substantially from a center of the inner bottom face;

b) obtaining a header having a through-aperture in which a lead terminal is hermetically fixed so as to extend through the header and so as to be electrically insulated from the header, the lead terminal having an end to which a contact member including a plurality of feather portions is secured, the feather portions being arranged radially to be approximately concentric with the housing and each having a predetermined elasticity;

c) enclosing an electrically conductive inertia ball in the housing;

d) accommodating an oscillation damping liquid in the housing, the oscillation damping liquid having a viscosity suitable to apply resistance to the inertia ball so that the inertia ball ceases rotating when an external oscillation previously applied to the inertia ball stops;

e) degassing the oscillation damping liquid so that impurities dissolved in the oscillation damping liquid are eliminated;

f) reducing pressure in an interior of the housing accommodating the inertia ball and the oscillation damping liquid therein to a predetermined value and subsequently, filling the housing with a pollution preventing gas; and g) hermetically securing the header to an open end of the housing so that the contact member is located in the housing, subsequently to the step of filling the housing with the pollution preventing gas.

8. A method according to 7, wherein the oscillation damping liquid, after having been degassed, is poured into the housing without contact with other gases.

* * * * *